(12) United States Patent
Matsushima

(10) Patent No.: US 6,391,137 B1
(45) Date of Patent: May 21, 2002

(54) METHOD FOR PRODUCING DISPLAY DEVICE

(75) Inventor: Yasuhiro Matsushima, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/408,854

(22) Filed: Sep. 30, 1999

(30) Foreign Application Priority Data

Oct. 2, 1998 (JP) ............................................ 10-280782
Sep. 14, 1999 (JP) ............................................ 11-260565

(51) Int. Cl.[7] ............................................... B32B 31/00
(52) U.S. Cl. ..................... 156/250; 156/154; 216/23; 216/52; 216/53; 216/95; 216/97; 368/84; 368/158; 368/242; 968/931
(58) Field of Search ................................... 156/154, 250; 216/23, 52, 53, 95, 97; 368/242, 158, 84; 968/931

(56) References Cited

U.S. PATENT DOCUMENTS 4,264,970 A * 4/1981 Nishimura et al. ......... 368/242
6,071,374 A * 6/2000 Kim ............................ 156/345
6,197,209 B1 * 3/2001 Shin et al. ..................... 216/84

FOREIGN PATENT DOCUMENTS

JP 2722798 B2 11/1997

OTHER PUBLICATIONS

Kameya, "Technical Report: Thickness–Reduction of TFT–LCD Glass Panel By Etching in After–Process: Sti Systems Technology Succeeded in Development of an Epoch–Making Etching System", Monthly FPD Intelligence, Apr. 1999, pp. 24–26.

* cited by examiner

Primary Examiner—Linda Gray
(74) Attorney, Agent, or Firm—Nixon & Vanderhye P.C.

(57) ABSTRACT

An object of the present invention is to provide a method for producing a display device by which a substrate is thinned efficiently. Onto one original substrate having an area for a plurality of display devices, the other original substrate is bonded via a sealing resin layer, the pair of bonded original substrates is divided and separated into a plurality of pairs of substrates of a size of each individual display device, and thereafter a substrate thinning process of thinning the substrates is performed in a state where the substrates are held by substrate holding means.

9 Claims, 12 Drawing Sheets

METHOD FOR PRODUCING DISPLAY DEVICE

BACKGROUND OF THE INVENTION

1. Field of the Invention

The present invention relates to a method for producing a display device, and specifically relates to a process of thinning a substrate which composes a display device.

2. Description of the Related Art

In recent years, electronic appliances, household electrical appliances, or the like, have been increasingly developed and produced and have been sold in quantity on the market, and not only a TV set but also a VTR, a personal computer, and the like, have also been spread widely among ordinary people. These appliances have grown their performances year by year, and have been indispensable in our modern society as a tool for providing the users with a lot of information as the information society progresses. Many of these appliances are equipped with a display device which serves as information displaying means for accurately transmitting information to the users, and as the display device, a low-profile and lightweight display device has been desired.

For example, Japanese Unexamined Patent Publication JP-A 4-116619 (1992) (JP-B2 2722798), discloses an invention which aims at weight-reduction of liquid crystal display devices. It discloses a method of producing a liquid crystal display device, capable of obtaining a plurality of liquid crystal display devices from a pair of glass substrates, wherein in order to thin the liquid crystal display devices, chemical abrasion is performed in a state of an assembly of the liquid crystal display devices in which the pair of substrates having an area for the plurality of liquid crystal display devices are bonded.

In the following, the prior art will be briefly explained referring to drawings.

FIGS. 12 and 13 show plan and sectional views of an assembly of liquid crystal display devices. (hereinafter described as an assembly of devices) made by bonding a pair of substrates having an area for the plurality of liquid crystal display devices. The assembly of devices A is assembled in the following manner.

At first, in each region of a pair of glass substrate a transparent electrode for display, an orientation film, and the like, (not shown in the drawings) are formed on each device division 6 on a pair of original glass substrates (so-called mother glass substrates) 1, 2.

Next, frame-shaped sealing materials 3 for respectively surrounding regions b of the respective in which liquid crystal is to be sealed regions b of the respective device divisions 6 are printed on the surface of one of the original glass substrates, and a periphery sealing material 4 for surrounding all of the device divisions 6 is printed slightly inside the edge of the periphery of the glass substrate. As such an adhesive, an epoxy-resin adhesive which has a high etching selectivity ratio with the original glass substrates 1, 2 is used. Moreover, each sealing material 3 is printed so that a clearance to become a liquid crystal injection hole 3a is left on part thereof, and the periphery sealing material 4 is printed so that a clearance to become a ventilation hole 4a is left on part thereof.

Next, the pair of original glass substrates 1, 2 are stacked on each other so that the respective device divisions 6 are opposed to each other, and the original glass substrates 1, 2 are adhered to each other via the sealing materials 3 and the periphery sealing material 4 as described above. In this case, a gap between the original glass substrates 1, 2 is connected with the outside via the liquid crystal injection holes 3a provided on parts of the respective sealing materials 3 and the ventilation hole 4a provided on part of the periphery sealing material 4, so that the barometric pressure between the original glass substrates 1, 2 would not be increased. Therefore, both the original glass substrates 1, 2 are globally adhered to each other with a uniform gap.

After that, the ventilation hole 4a as mentioned above is encapsulated by an encapsulating material 5 such as an epoxy-resin adhesive which has a high etching selectivity ratio with both the original glass substrates 1, 2, whereby the assembly of devices A is completed.

After the assembly of devices A is assembled in this way, the assembly of devices A is immersed in an etchant 11 inside an etching tank 10 to etch the outer faces of both the original glass substrates 1, 2 of the assembly of devices A as shown in FIG. 14. In this case, an etchant which basically consists of hydrofluoric acid is used as the etchant 11.

When the assembly of devices A is immersed in the etchant 11 to etch the outer faces of both the original glass substrates 1, 2 in this way, the thickness of each of the original glass substrates 1, 2 is reduced from the initial thickness as shown by a dashed line to the thickness as shown by a rigid line in FIG. 14. Moreover, since etching of the original glass substrates 1, 2 is performed uniformly all over the outer faces of the substrates, the overall original glass substrates 1, 2 are thinned uniformly.

Further, when the assembly of devices A is immersed in the etchant 11, the etchant 11 would enter the gap between the original glass substrates 1, 2. However, in the production method as described above, the pair of original glass substrates 1, 2 are adhered to each other via the periphery sealing material 4 which surrounds all of the device divisions 6 when the assembly of devices A is assembled, the ventilation hole 4a provided on part of the periphery sealing material 4 is encapsulated by the encapsulating material 5, and the sealing material 4 and the encapsulating material 5 are made by an epoxy-resin adhesive, or the like, which has a high etching selectivity ratio with the original glass substrates 1, 2. Therefore, it is avoided by the periphery sealing material 4 that the etchant 11 enters the gap between the original glass substrates 1, 2.

Therefore, in etching of the outer faces of the original glass substrates 1, 2, the inner sides of the respective device divisions 6, that is, electrode terminal arrays outside the sealing materials 3 and the liquid crystal sealed-in regions b surrounded by the sealing materials 3 would not be subjected to the etchant 11. As for both the original glass substrates 1, 2, although not only the outer faces but also the periphery faces are etched, it is prevented by the periphery sealing material 4 that the etchant 11 enters the gap between the original glass substrates 1, 2 before the peripheral faces of the glass substrates 1, 2 are etched to recess inside the inner peripheral face of the periphery sealing material 4. Therefore, as long as the periphery sealing material 4 as mentioned above is printed slightly inside the edge of the periphery of the substrate and the periphery sealing material 4 is made to have a sufficient width, any problem would not be caused when the peripheral faces of the glass substrates 1, 2 are etched.

After the outer faces of both the original glass substrates 1, 2 are etched in this way in a state where the assembly of devices A is assembled, the assembly of devices A is washed immediately to thoroughly eliminate the etchant attached thereon, and thereafter both the original glass substrates 1, 2 of the assembly of devices A as mentioned above are divided for each device division 6, with the result that the assembly of devices A is separated into cell members of individual liquid crystal display devices.

After that, a liquid crystal material is injected by the vacuum injection method into the gap between the substrates of a cell member of each liquid crystal display device, and the injection hole 3a is encapsulated by an encapsulating resin, whereby a liquid crystal display device is completed. The vacuum injection method is a method of immersing an injection hole of a liquid crystal display device in a liquid crystal pool which contains liquid crystal after producing a vacuum state in a vacuum chamber, and then returning the pressure inside the vacuum chamber to the original barometrical pressure, thereby performing injection of liquid crystal. According to this method, injection of liquid crystal into a cell member of a liquid crystal display device can be performed easily and uniformly.

In the method for producing a display device as shown above, the substrates are thinned in a state of an assembly of devices using an etching tank, so that it is necessary to prepare a large etching tank, and accordingly it is also necessary to prepare a large quantity of etchant. Therefore, the production efficiency is low. Moreover, the thinned assembly of devices is hard to handle and it is apt to break when it is pulled out from the etching tank and conveyed, so that a lot of caution is required to pay.

Further, particularly in the liquid crystal display device disclosed in the prior art as shown above, injection of a liquid crystal material is performed by the vacuum injection method in a state where the substrates were thinned, so that there is a problem that the substrates are broken or chipped in the vacuum injection process.

Furthermore, although it may be considered to thin the substrates in a state of divided substrates instead of thinning the substrates in a state of an assembly of devices as described above, such a problem would be caused that throughput is worse and the production process is longer when the substrates are thinned one by one in a state of divided substrates.

SUMMARY OF THE INVENTION

The present invention was made in view of the problems as mentioned above, and an object of the invention is to provide a method for enabling to easily produce a low-profile and lightweight display device by efficiently thinning a substrate.

The invention provides a method for producing a display device which is composed by at least a pair of substrates, comprising the steps of:

forming a sealing resin layer on one original substrate having an area for a plurality of display devices, of a pair of original substrates;

bonding the other original substrate onto the one original substrate having an area for a plurality of display devices via the sealing resin layer;

dividing the pair of original substrates having been bonded to separate the pair of original substrates into a plurality of pairs of substrates having an area for each individual device; and performing a substrate thinning process of causing substrate holding means to hold the pairs of substrates having been separated to be of a size of each individual display device and thinning at least one substrate of each pair of substrates in a state where the substrates are held by the substrate holding means.

That is to say, the other original substrate is bonded onto the one original substrate having an area for a plurality of display devices via the sealing resin layer, the pair of original substrates having been bonded is divided and separated into a plurality of substrates of a size of each individual display device, and thereafter the substrate thinning process of thinning the substrates is performed in a state where the substrates are held by the substrate holding means. As compared with a case of performing the thinning process in a state of an assembly of devices which has original substrates having an area for a plurality of display devices, it is not necessary in the invention to prepare a large etching tank, and accordingly it is not necessary to prepare a large quantity of etchant.

Further, a plurality of substrates having been separated to be of a size of each individual display device are thinned at a time while being held by the substrate holding means, so that throughput is good, and the substrate thinning process can be efficiently performed. As a result, it is possible to implement a lightweight and low-profile display device in a simple manner.

Further, in the invention it is preferable that the step of performing the substrate thinning process of thinning the substrate is performed by a chemical abrading method.

That is to say, since the substrate thinning process is performed by the chemical abrading method, it is possible to perform the substrate thinning process which causes little damage to the substrates.

Still further, in the invention it is preferable that the step of performing the substrate thinning process of thinning the substrate is performed in a state where encapsulating means is formed on an end portion of the pair of substrates having been divided to be of a size of each individual display device.

That is to say, since the step of performing a substrate thinning process of thinning a substrate is performed in a state where encapsulating means is formed on the end portion of the pair of substrates having been separated, it is possible to perform the substrate thinning process which causes little damage to a terminal section, or the like, formed on the pair of substrates having been separated.

Still further, in the invention it is preferable that the encapsulating means is formed in the same step as the step of forming the sealing resin layer on the one original substrate having an area for a plurality of display devices.

That is to say, since the encapsulating means is formed in the same step as the step of forming the sealing resin layer, it is not necessary to add a new step, and it is possible to easily form the encapsulating means on the edge of the pair of substrates having been separated.

Still further, in the invention it is preferable that a plurality of display sections and driving circuit sections for supplying signals to the display section are respectively formed on the one original substrate having an area for a plurality of display devices, and the sealing resin layer is placed around each display section while the encapsulating means is placed around each driving circuit section.

That is to say, since the sealing resin layer is placed around each display section and the encapsulating means is placed around each driving circuit section, it is possible even in a driving circuit integral-type display device to implement the substrate thinning process in a simple manner without causing damage to the driving circuit sections formed on the substrate.

Still further, in the invention it is preferable that the substrate holding means is a substrate cassette capable of storing a plurality of pairs of substrates having been separated to be of a size of each individual display device.

That is to say, since the substrate holding means is a substrate cassette which is capable of storing a plurality of pairs of substrates having been separated, damage to the substrates is minimized, and it is possible to perform the thinning process of a plurality of display appaatuses in a simple manner.

Still further, in the invention it is preferable that the other original substrate which is bonded onto the one original substrate having an area for a plurality of display devices via the sealing resin layer has an area for substantially one display device.

That is to say, since the other original substrate which is bonded onto the one original substrate having an area for a plurality of display devices has an area for substantially one display device, it is not necessary to bond the other substrate onto a portion opposed to a faulty component of a display device, and it is possible to bond the other substrate only onto conforming items, whereby it is possible to enhance the conforming item factor of display device.

Still further, in the invention it is preferable that before the substrate thinning process, a liquid crystal material is injected into a gap surrounded by the sealing resin layer between the pair of substrates having been separated to be of a size of each individual display device.

That is to say, injection of a liquid crystal material into the gap between the pair of substrates having been separated makes it possible to efficiently produce a low-profile and lightweight liquid crystal display device.

Since performing the step of injecting a liquid crystal material before the substrate thinning process makes it possible to perform injection of liquid crystal in a state where the pair of substrates having been separated have not been thinned, the substrates would not be broken or chipped in the step of injecting liquid even when a liquid crystal material is injected by the vacuum injection method.

The invention provides a method for producing a display device composed of at least a pair of substrates, the method comprising the step of performing a substrate thinning process of, in a state where a plurality of pairs of substrates which respectively be of a size of each individual display device are held by substrate holding means, thinning at least one substrate of each pair of substrates.

According to the invention, in the method for producing a display device, the substrate thinning process is performed in a state where the plurality of pairs of substrates which respectively be of a size of each individual display device are held by the substrate holding means. For this reason, in the method for producing a display device according to the invention, it is possible to use a smaller etching tank than that used for performing a thinning process in a state of an assembly of devices, and hence the required quantity of an etchant for the substrate thinning process is less than the required quantity thereof for the thinning process performed in a state of an assembly of devices. In addition, the plurality of pairs of substrates are subjected to the thinning process at a time, so that the throughput of the thinning process is enhanced as compared with a case of thinning the plurality of pairs of substrates one by one, and hence it is possible to perform the thinning process in an efficient manner. As a result, it is possible to easily implement a more lightweight and lower-profile display device than a display device according to the prior art.

In the invention it is preferable that before the step of performing the substrate thinning process the respective pairs of substrates are bonded to each other via a sealing material and encapsulating means is placed at an end portion of the respective pairs of substrates, the encapsulating means encapsulates a space between the pair of substrates; and the encapsulating means is placed in the step of placing the sealing material between the pair of substrates.

According to the invention, in the method for producing a display device, the encapsulating means and the sealing material are formed in the same step. For this reason, it is not necessary to add an extra step of forming the encapsulating means to the steps of producing a display device, so that it is possible to form the encapsulating means at the end portion of the pair of substrates in a simple manner.

In the invention it is preferable that before the step of performing the substrate thinning process a display section including a component related to display and a driving circuit section for supplying signals to the display section are formed between the respective pairs of substrates, the sealing material is placed around the display section; and the encapsulating means is placed around the driving circuit section.

According to the invention, in the method for producing a display device, the encapsulating means is formed around the driving circuit section of the pair of substrates bonded by the sealing material. For this reason, also in a driving circuit integral-type display device, it is possible to perform the substrate thinning process in a simple manner without causing damage to the driving circuit section formed on the pair of substrates.

In the invention it is preferable that the substrate holding means is a substrate cassette capable of holding the plurality of pairs of substrates of a size of each individual display device at a time.

According to the invention, in the method for producing a display device, the plurality of pairs of substrates are held in the substrate cassette at a time. As a result, damage to the substrates is minimized, so that it is possible to perform the process of thinning the plurality of pairs of substrates in a simple manner.

In the invention it is preferable that the method for producing a display device further comprises the step of sealing in a liquid crystal material between the pair of substrates.

According to the invention, in the method for producing a display device, the liquid crystal material is sealed in between the pair of substrates, whereby it is possible to efficiently produce a more lightweight and lower-profile liquid crystal display device than a liquid crystal display device according to the prior art. The injection step of the liquid crystal material is preferably performed before the substrate thinning process, whereby it is possible to inject liquid crystal in a state where the thickness of the pair of substrates is more than that of a completed liquid crystal display device. As a result, the substrates would not be broken or chipped in the injection step of liquid crystal even when the liquid crystal material is injected by the vacuum injection method, so that it is possible to produce a liquid crystal display device in a more efficient manner.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
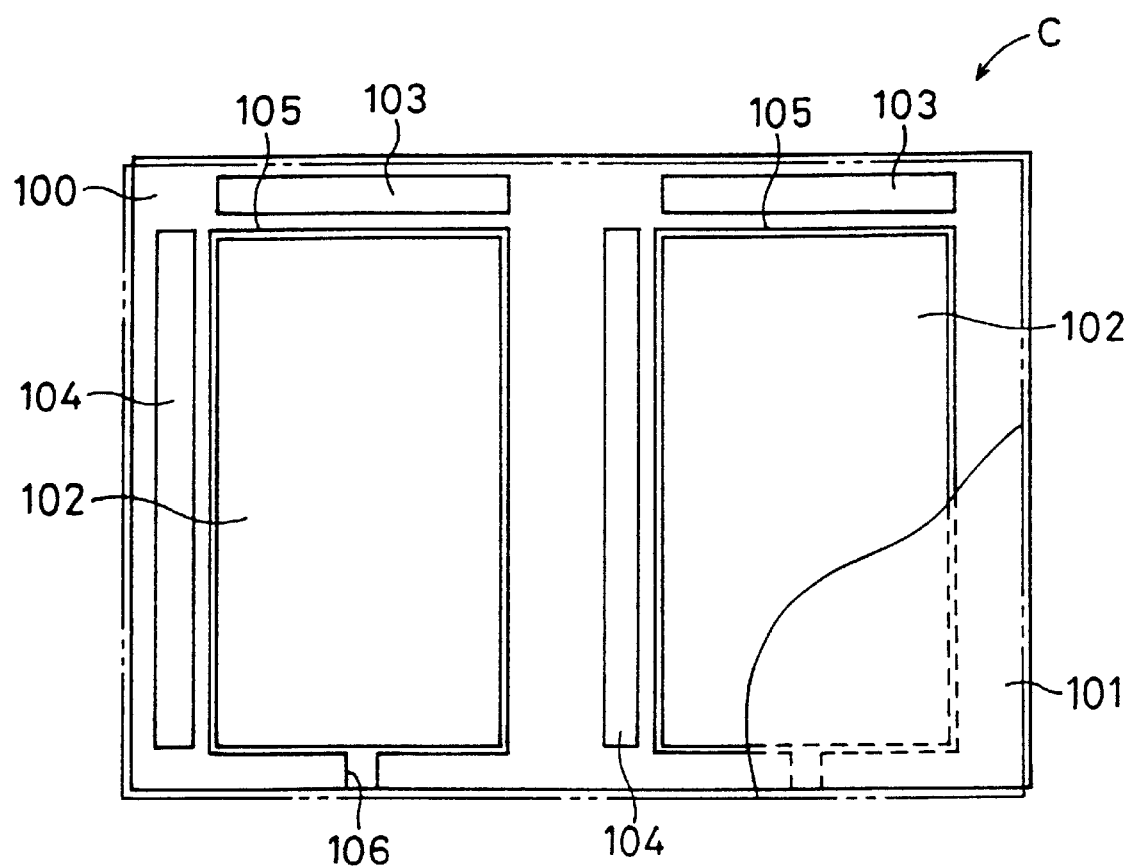
FIG. 1 is a plan view showing an assembly of liquid crystal display devices in a first embodiment of the invention.

Now referring to the drawings, preferred embodiments of the invention are described below.

Figure 2:
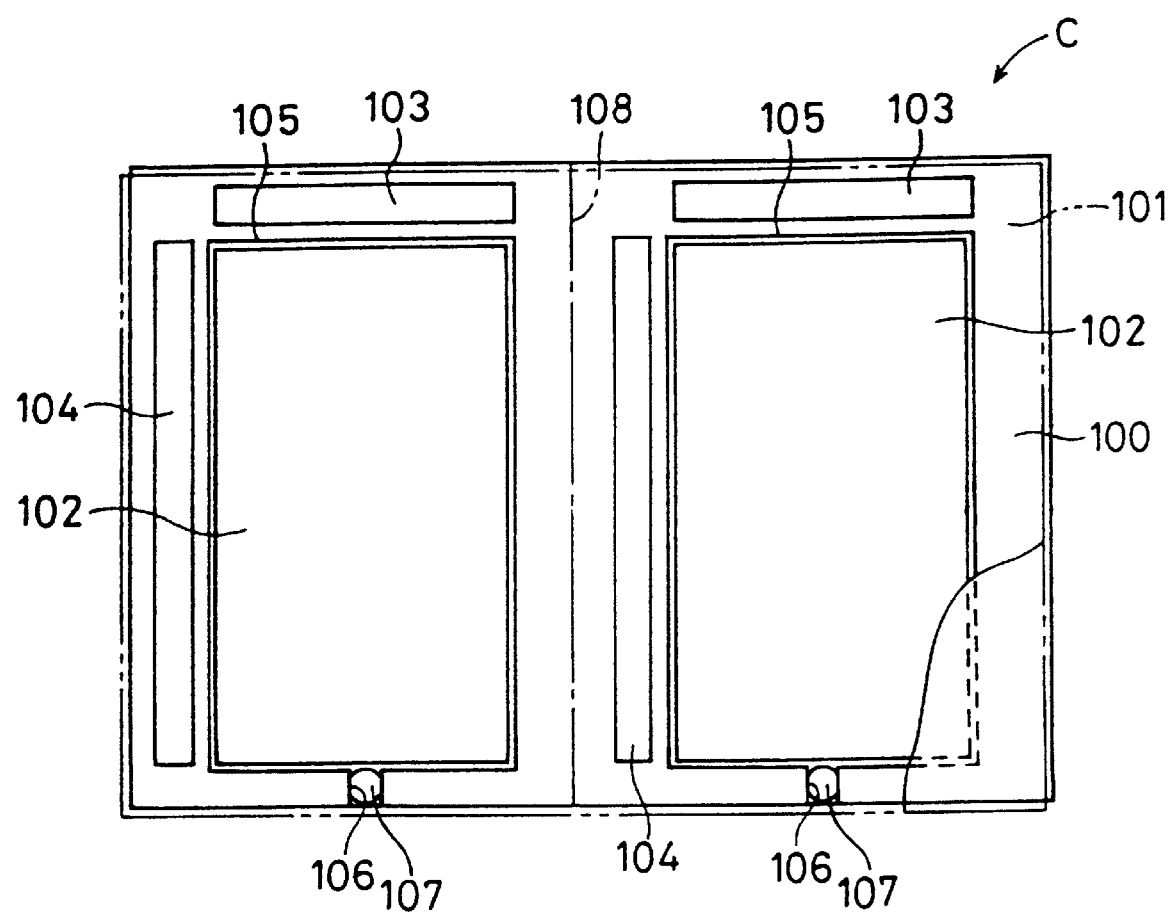
FIG. 2 is a plan view showing the assembly of liquid crystal display devices in the first embodiment of the invention.

FIGS. 1 and 2 are plan views showing an assembly of devices C of a first embodiment of the invention. As apparent from FIGS. 1 and 2, an assembly of devices C comprising two liquid crystal display devices will be illustrated in the first embodiment. In the drawings attached to this specification, "the other glass substrate 101" described later is cut away partly.

As shown in FIG. 1, on one original glass substrate 100, which is so-called mother glass, of a pair of original glass substrates 100, 101 having an area for two liquid crystal display devices and a thickness of 1 mm, a display section 102 and two terminal sections 103, 104 for supplying signals to the display section 102 are formed, respectively. On the display section 102, components associated with display of a liquid crystal display device, such as a transparent electrode for display and an orientation film, are placed. Moreover, for the purpose of bonding the one original glass substrate 100 to the other original glass substrate 101 having an area for two liquid crystal display devices, a sealing resin 105 which functions as both a member for bonding the substrates and a member for encapsulating liquid crystal is formed on the one original glass substrate 100 so as to surround the above-said display section 102. The sealing resin 105 is formed in the shape of a frame, whose height from the surface of the original glass substrate 100 is more than those of the components formed on the display section 102. The sealing resin is provided with a clearance to become an injection hole 106 of liquid crystal. The one original glass substrate 100 in this state is placed so that the sealing resin 105 is in immediate proximity to the other original glass substrate 101, and then the one original glass substrate 100 and the other original glass substrate 101 are bonded to each other. The components associated with display of a liquid crystal display may be also formed on the surface of the other original glass substrate 101. As a result, the assembly of devices C as shown in FIG. 1 is completed.

Next, as shown in FIG. 2, both the original glass substrates 100, 101 of the assembly of devices C are divided for each display section 102 at a position indicated by a center line 108, whereby the assembly of devices C is separated into cell members of individual liquid crystal display devices. Then, in order to form a liquid crystal display device, through the injection hole 106 of a cell member of each individual liquid crystal display device, a liquid crystal material is injected by the vacuum injection method into a gap surrounded by the sealing resin 105 between the two glass substrates of the cell member having been divided, and the injection hole 106 is encapsulated by placing an encapsulating material 107 at the injection hole 106.

Figure 3:
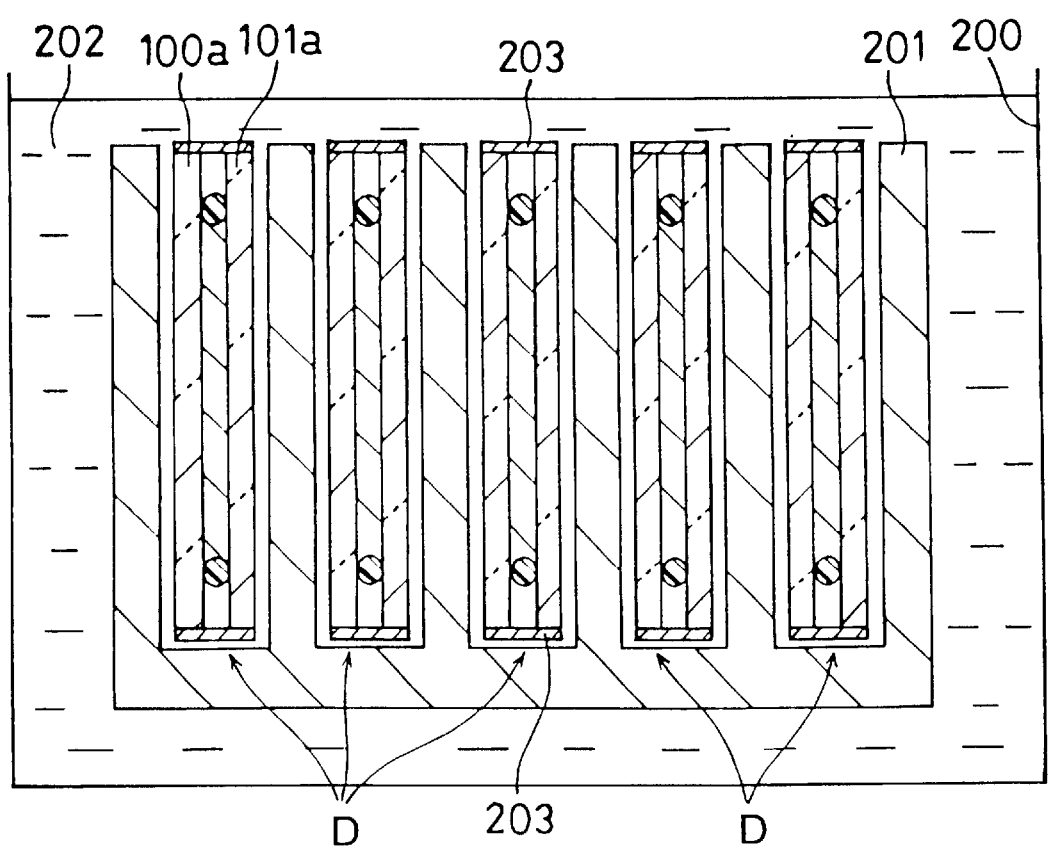
FIG. 3 is a schematic sectional view showing the step of thinning glass substrates which compose liquid crystal display devices in the first embodiment of the invention.

FIG. 3 is a schematic sectional view showing the step of thinning the glass substrates 100a, 101a which compose a liquid crystal display device D in the first embodiment.

As apparent from FIG. 3, in the first embodiment, a cell member produced in the steps as shown in FIGS. 1 and 2 in which liquid crystal was sealed, that is, a liquid crystal display device D is stored in a substrate cassette 201 which is capable of storing a plurality of liquid crystal display devices, and a plurality of (five, in the embodiment) display devices are immersed at a time in an etching tank 200 which contains an etchant 202 consisting of hydrofluoric acid or the like, whereby the thinning process of the glass substrates 100a, 101a composing the liquid crystal display device D is performed.

Figure 4:
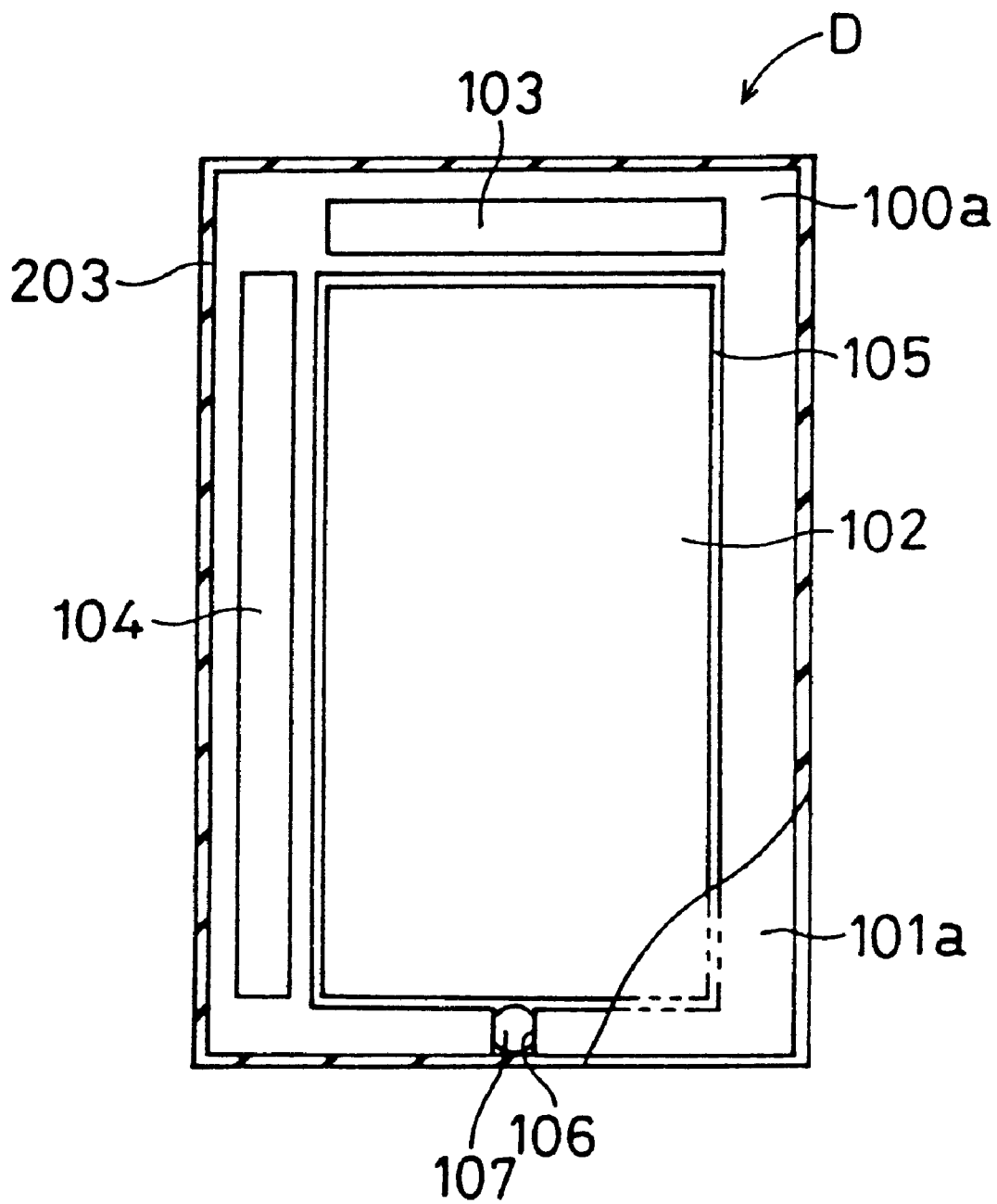
FIG. 4 is a plan view showing a liquid crystal display device in the first embodiment of the invention.

In this case, as shown in FIG. 4, for the purpose of preventing the terminal sections 103, 104 of the liquid crystal display device D from being damaged by the etchant 202, encapsulating means 203 for preventing the etchant from entering the gap between the two glass substrates 100a, 101a composing the liquid crystal display device D is provided at the end portions of the glass substrates 100a, 101a before etching, and the substrate cassette 201 is immersed in the etchant 202 in this state. As the above-said encapsulating means 203, a thin film which is made by a material resistant to the etchant 202 may be bonded to the side portions of the pair of glass substrates 100a, 101a having been divided, to encapsulate the gap between the divided glass substrates 100a, 101a.

Figure 5:
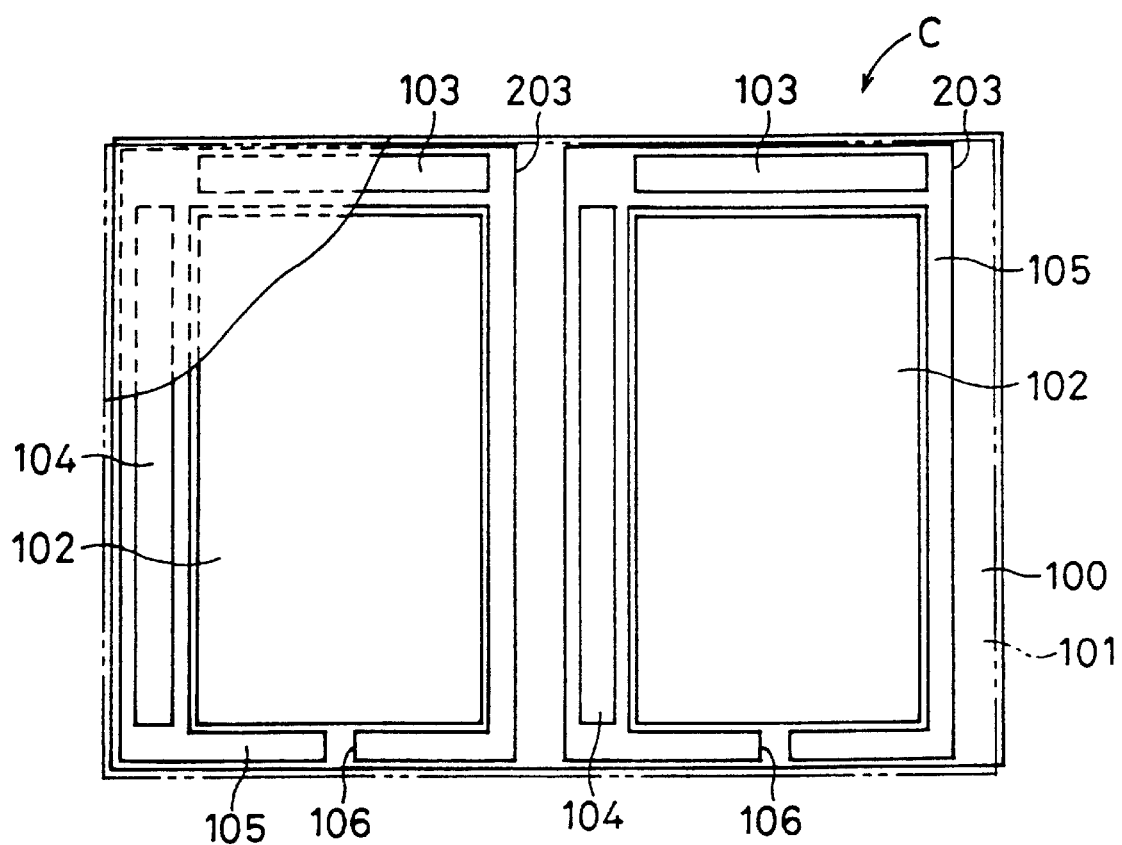
FIG. 5 is a plan view showing the assembly of liquid crystal display devices in the first embodiment of the invention.

As another example of the above-said encapsulating means 203, as shown in FIG. 5, at the time of forming the assembly of devices, simultaneously with forming the sealing resin 105 for bonding the original glass substrates 100, 101 to each other, a member to become the encapsulating means 203 may be formed by the same material as used for the sealing resin 105 at the end portions of the original glass substrates 100, 101 excluding the injection opening 106. As a result, it is possible to form the encapsulating means 203 more easily. In the example of FIG. 5, the sealing resin 105 and the encapsulating means 203 are integrated into one piece.

In a state where a plurality of liquid crystal display devices D produced in this way are stored in the above-mentioned substrate cassette 201 and immersed in the etching tank 200 containing the etchant 202, the respective glass substrates 100a, 101a composing each liquid crystal display device D are thinned so as to have a thickness of about 0.3 mm to 0.7 mm, and thereafter the substrate cassette 201 is pulled out and washed by pure water to thoroughly eliminate the etchant attached thereon.

Figure 6:
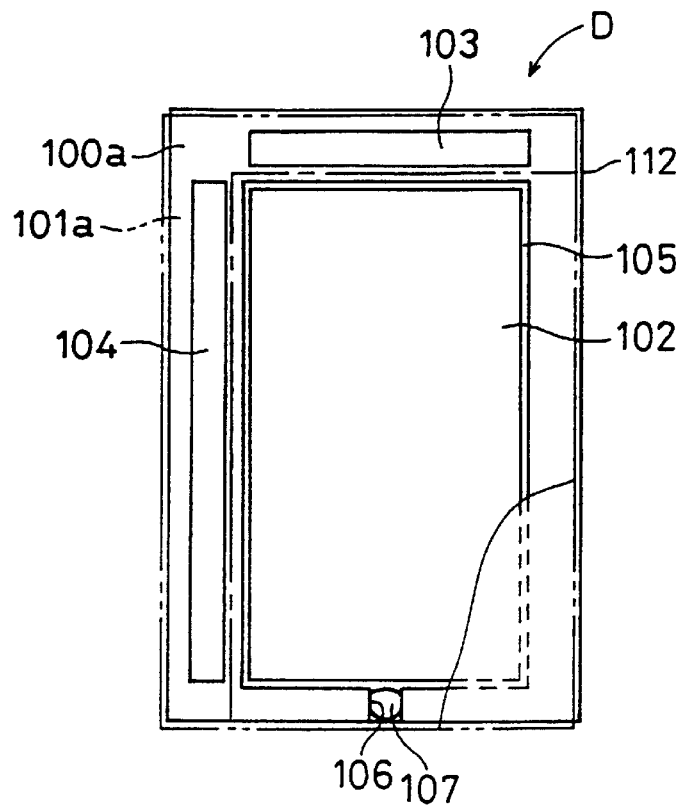
FIG. 6 is a plan view showing the liquid crystal display device in the first embodiment of the invention.
Figure 7:
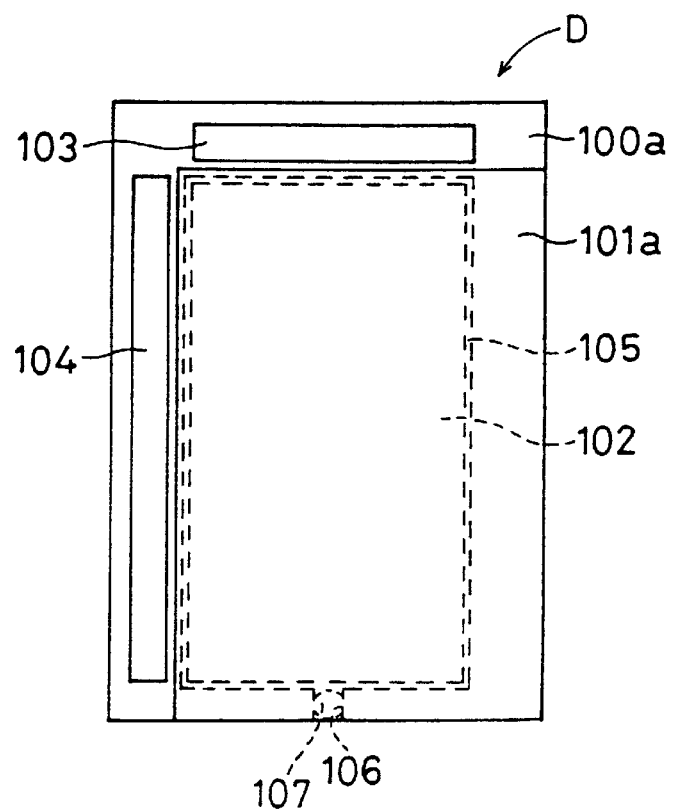
FIG. 7 is a plan view showing the liquid crystal display device in the first embodiment of the invention.

After that, as shown in FIG. 6, the encapsulating means 203 is removed from the substrates by dividing the end portions of the pair of glass substrates 100a, 101a composing the liquid crystal display device D or peeling off the encapsulating means 203 from the substrates, and then only the glass substrate 101a on which the terminal sections 103, 104 are not formed is divided at a position indicated by a center line 112 so that the terminal sections 103, 104 are exposed. In the end, an FPC, or the like, for inputting signals to the terminal sections 103, 104 is installed, with the result that the liquid crystal display device D as shown in FIG. 7 is completed.

In the method for producing a liquid crystal display device in the first embodiment, the thinning process is performed by placing the encapsulating means between the two glass substrates 100a, 101a which compose the liquid crystal display device D, and immersing the liquid-crystal display device Din which liquid crystal was sealed, in the etching tank. The invention is not limited to the embodiment of performing such a thinning process as described above, and may be implemented by an embodiment of performing a thinning process of the glass substrates 100a, 101a by performing chemical abrasion from one side of the outer faces of the glass substrates 100a, 101a composing a liquid crystal display device, in which case it is not necessarily required to place the encapsulating means between the two glass substrates 100a, 101a having been divided.

Further, in the method for producing a liquid crystal display device in the first embodiment, the pair of original glass substrates which have an area for two liquid crystal display devices are bonded to each other. Otherwise, for example, only the one original glass substrate 100 on which the display sections and the terminal sections are formed may have an area for a plurality of liquid crystal display devices at all times during production of the assembly of devices, while the other original glass substrate 101 to be bonded to the one original glass substrate 100 may be divided into substrates having an area for substantially one liquid crystal display device and thereafter bonded to the one original glass substrate at positions opposed to the respective display sections 102. According to this method, in a case where a defect is found in one of the terminal sections or the display section formed on the one glass substrate 100, it is not necessary to bond the other glass substrate 101a having an area for one liquid crystal display device to a position opposed to such a faulty section, with the result that it is possible to efficiently use the original glass substrates. Also in the above case, after division of the assembly of devices into the cell members of individual liquid crystal display devices, a plurality of pairs of substrates of liquid crystal display devices may be thinned at a time while being held by the substrate cassette, or the like.

As explained above, in the method for producing a display device in the first embodiment, the assembly of devices is produced by bonding the other original substrate onto the one original substrate having an area for a plurality of display devices via the sealing resin, the original substrates of the assembly of devices are separated into individual display devices by dividing the pair of bonded substrates, and thereafter the substrate thinning process of thinning the substrates having been separated is performed in a state where the substrate holding member is caused to hold a plurality of substrates having been separated. For this reason, as compared with the production method of the prior art in which the substrate thinning process is performed in a state of the original substrates having an area for a plurality of display devices, that is, in a state of the assembly of devices, it is not necessary in the production method of the first embodiment to prepare a large etching tank and accordingly it is not necessary to prepare a large quantity of etchant.

Further, in the method for producing a display device in the first embodiment, a plurality of pairs of substrates having been separated into substrates of a size of each individual display device are thinned at a time while being held by the substrate holding member. Therefore, throughput is excellent and the substrate thinning process can be performed efficiently, with the result that it is possible to implement a low-profile and lightweight display device in a simple way.

In the method for producing a display device in the first embodiment, when a display device has a construction that a liquid material such as liquid crystal material is sealed in a gap between a pair of substrates, the step of injecting the liquid material is performed before the substrates of the display device are subjected to the thinning process. As a result, it is possible to perform the step of injecting liquid material into a cell member in a state where the pair of substrates composing the cell member which has a hollow are not thinned, so that the substrates of the cell member would not be broken or chipped in the injection step even when the liquid material is injected by the vacuum injection method. Consequently, production of a display device is further facilitated.

Further, in the method for producing a display device of the first embodiment, instead of the substrate thinning process by the etching method, a substrate thinning process may be performed by the chemical abrading method. As a result, it is possible to perform the substrate thinning process which causes little damage to the substrates.

Still further, in the method for producing a display device of the first embodiment, the step of the substrate thinning process of thinning the substrates having been separated is performed in a state where the encapsulating means is formed at the end portions of the substrates having been separated. As a result, it is possible to perform the substrate thinning process which causes little damage to the terminal section, and the like, formed on the separated substrates.

Still further, the encapsulating means is formed in the same step as the step of forming the sealing resin. As a result, it is not necessary to add a new step in the steps of producing a display device in order to form the encapsulating means, and it is possible to easily form the encapsulating means at the end portions of the substrates having been separated.

Still further, the substrate holding member is implemented by a substrate cassette which is capable of storing a plurality of pairs of substrates having been separated. As a result, little damage is caused to the substrates having been separated, and the thinning process of a plurality of display devices can be performed in a simple way.

Still further, in production of the assembly of devices, the other original substrate bonded onto the one original substrate having an area for a plurality of display devices may be implemented by a plurality of substrates having an area for substantially one display device. As a result, it is not necessary to bond the other original substrate to a portion on the one original substrate which is opposed to a faulty component of a display device, and it is possible to bond the other original substrate only to portions opposed to conforming items, whereby it is possible to enhance the conforming item factor of a display device.

In the method for producing a display device as illustrated above, it is possible to efficiently produce a low-profile and lightweight liquid crystal display device by injecting a liquid crystal material into a gap opposed to the display section between the substrates of a cell member having been separated.

When the method for producing a liquid crystal display device of the first embodiment is compared with the method for producing a liquid crystal device which is the prior art disclosed in Japanese Examined Patent Publication JP-B2 2722798, the method for producing a liquid crystal display device of the first embodiment has a benefit with regard to the liquid crystal injection step as mentioned below.

Previously, the vacuum injection method is mainly adopted in the liquid crystal injection step. The liquid crystal injection step by the vacuum injection method will be described below. At first, a cell member which has a hollow inner space and an injection plate which is filled with a liquid crystal material are installed at a preset space in a vacuum chamber. Next, a vacuum is produced inside the vacuum chamber. When a vacuum is thus produced in the inner space of the cell member, an injection hole of the cell member is immersed in the liquid crystal material within the injection plate, and nitrogen is leaked into the vacuum chamber. As a result, due to the pressure difference between the inside and the outside of the cell member, the liquid crystal material penetrates into the cell member. After the liquid crystal material is injected into the cell member by the vacuum injection method in accordance with the steps as illustrated above, the cell member is pulled out of the injection plate, liquid crystal attached to the outside wall and the injection hole of the cell member is deleted, and the injection hole is encapsulated. In order to inject the liquid crystal material into a plurality of cell members at a time by using the vacuum injection method, it is necessary to immerse the injection holes of the plurality of cell members in the liquid crystal material at a time.

In the method for producing a liquid crystal display device of the first embodiment, for the purpose of preventing the substrates of the cell member from being broken and chipped, the liquid crystal injection step is performed before the step of thinning the substrates. In the method for producing a liquid crystal display device of the first embodiment, the assembly of devices C is separated into a plurality of cell members before the step of thinning substrates, so that it is possible to perform the liquid crystal injection step between the step of separating an assembly of devices and the step of thinning substrates. In a case of performing the liquid crystal injection step by using the separated cell members, it is possible to immerse the injection holes of all the cell members which were the composition of the single assembly of devices C, in the liquid crystal material within the injection plate at a time, whereby it is possible to prevent the substrates of the cell member from being broken and chipped during injection of liquid crystal, and easily implement the step of injecting liquid crystal into a plurality of cell members at a time by using the vacuum injection method. For this reason, when the conventional production line of a liquid crystal display device is modified to execute the production method of the first embodiment, change of an device used for the liquid crystal injection step is not required, so that it is easy to change the production line.

Figure 12:
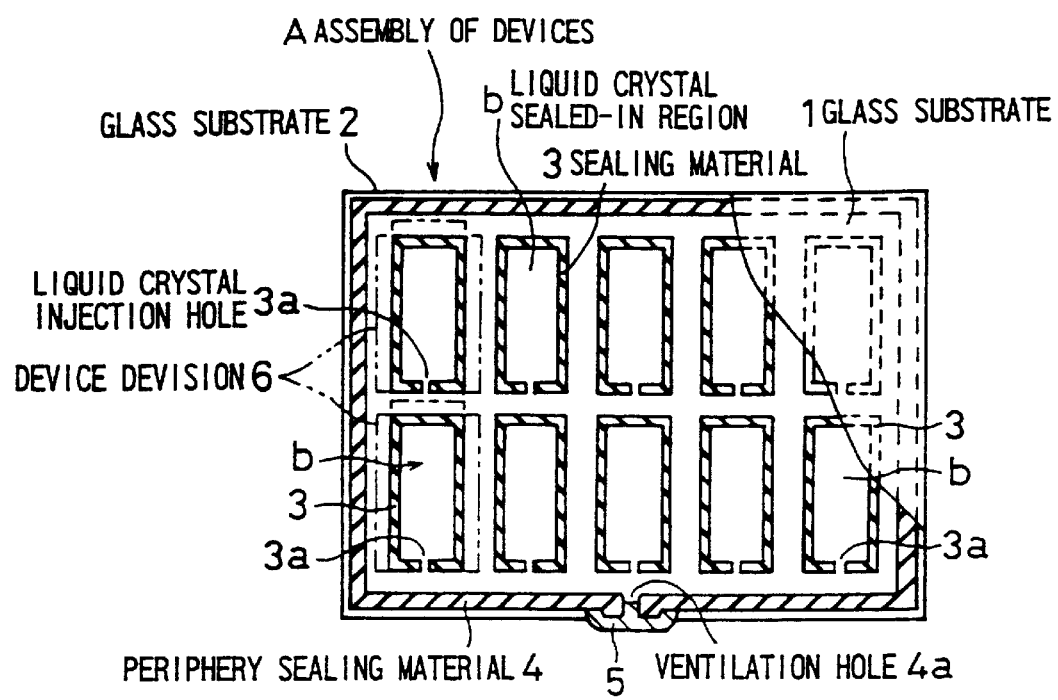
FIG. 12 is a plan view showing a prior art assembly of liquid crystal display devices.
Figure 13:
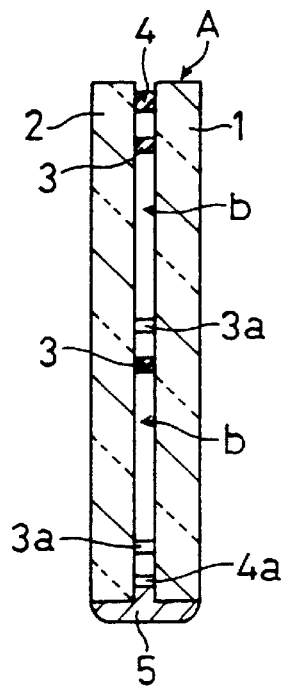
FIG. 13 is a sectional view showing the prior art assembly of liquid crystal display devices.
Figure 14:
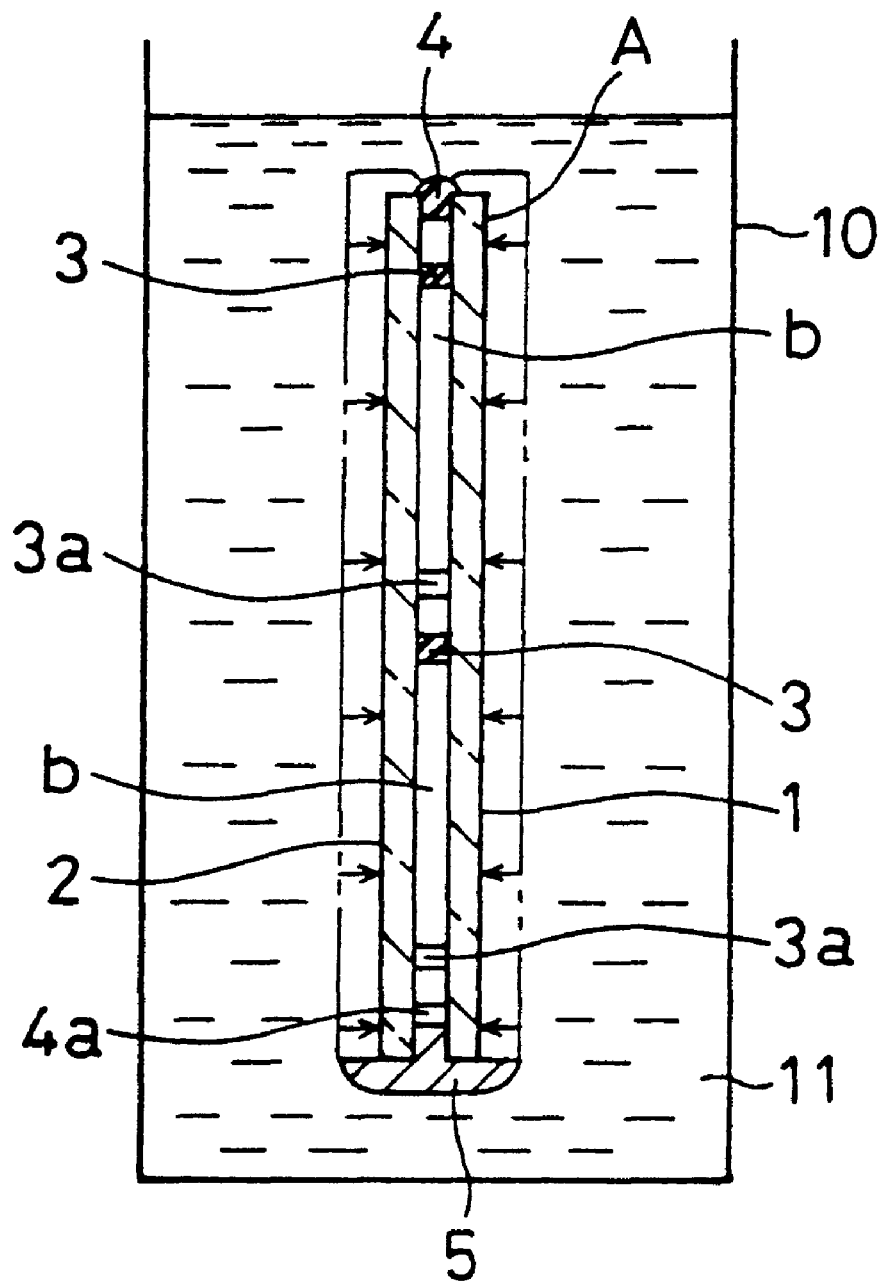
FIG. 14 is a schematic sectional view showing the step of thinning glass substrates which compose liquid crystal display devices in the prior art.

In the method for producing a liquid crystal display device disclosed in JP-B2 2722798, the substrate thinning process is performed in a stage of the assembly of devices A made by bonding mother glasses as shown in FIG. 12. In the production method disclosed in JP-B2 2722798, in order to perform the liquid crystal injection step before the step of thinning substrates, it is necessary to inject liquid crystal into the inner spaces of the respective device divisions 6 of the assembly of devices A in a state where the assembly of devices A has not been divided yet. In this case, since it is difficult to immerse the injection holes of all the device divisions 6 of the assembly of devices A shown in FIG. 12, in the liquid crystal material within the injection plate at a time, it is extremely difficult to adopt the vacuum injection method to the liquid crystal injection step. Therefore, it is necessary to adopt a method other than the vacuum injection method to the liquid crystal injection step. When the conventional production line of a liquid crystal display device is modified to perform the production method disclosed in JP-B2 2722798, there is a strong likelihood that change of the device used for the liquid crystal injection step is required, and hence a lot of time and effort is expended in modifying the production line. On the basis of the reasons mentioned above, the method for producing a liquid crystal display device of the first embodiment facilitates the liquid crystal injection method more than the production method disclosed in JP-B2 2722798.

Next, a method for producing a display device in a second embodiment of the invention will be illustrated in the following. As the display device of the second embodiment, a driver integral-type liquid crystal display device is used.

Figure 8:
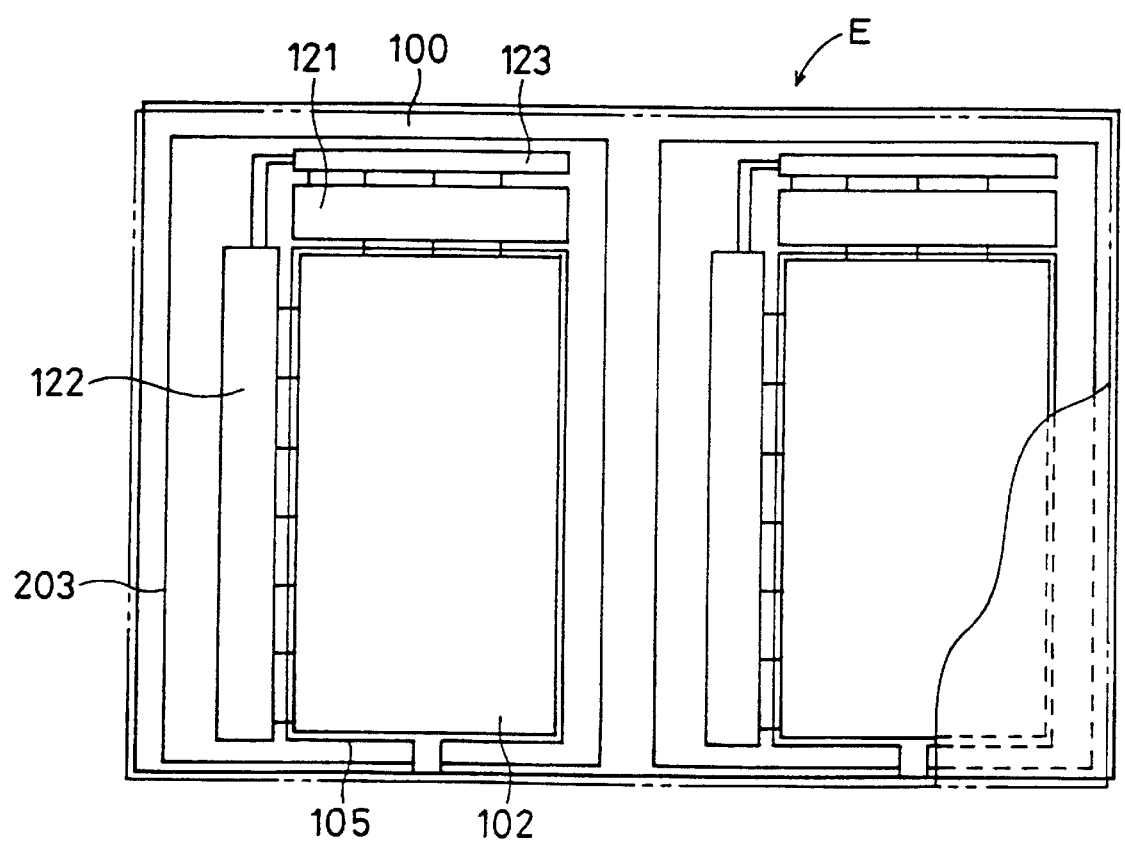
FIG. 8 is a plan view showing an assembly of driver integral-type liquid crystal display devices in a second embodiment of the invention.
Figure 9:
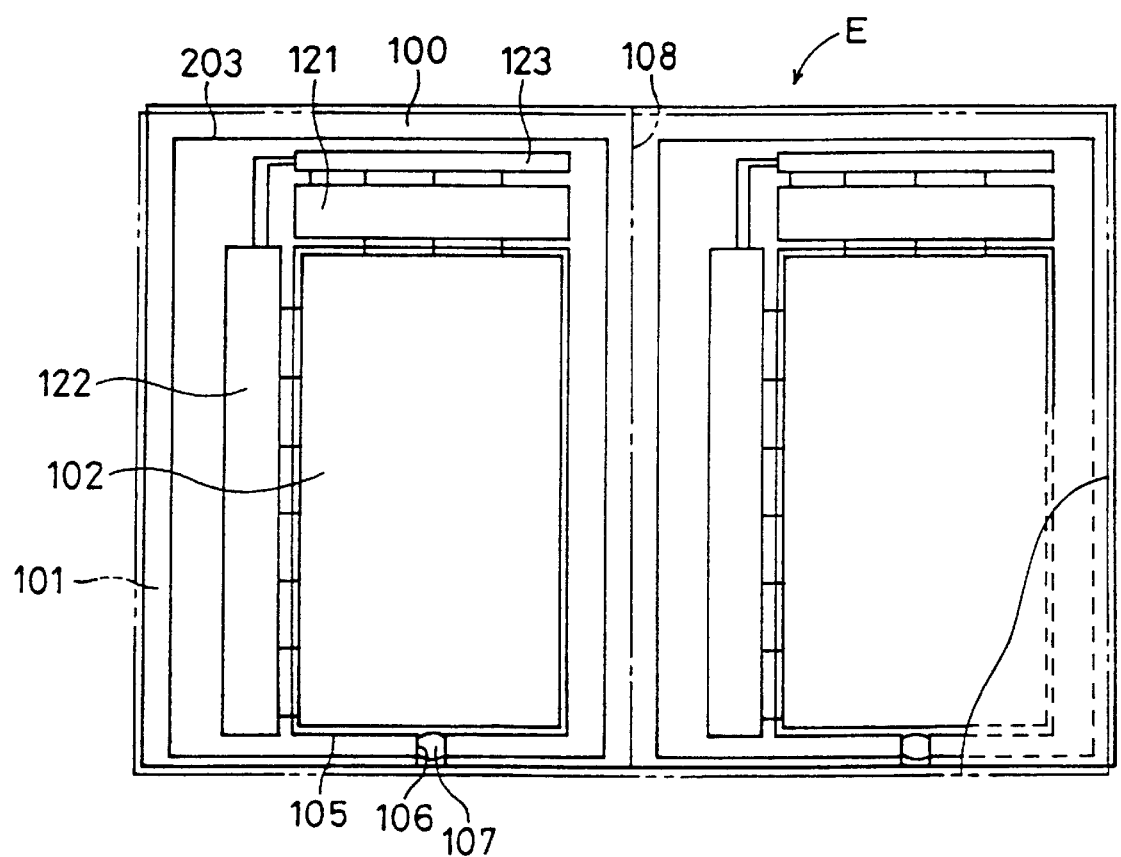
FIG. 9 is a plan view showing the assembly of driver integral-type liquid crystal display devices in the second embodiment.

FIGS. 8 and 9 are plan views showing an assembly of devices E in the second embodiment. As apparent from FIGS. 8 and 9, an assembly of devices E which has an area for two liquid crystal display devices will be illustrated in the second embodiment as well.

As shown in FIG. 8, on one original glass substrate 100 of a pair of original glass substrates 100, 101 which have an area for two liquid crystal display devices and a thickness of 1 mm, a display section 102 and driving circuit sections 121, 122 for supplying signals to the display section 102 are formed on the same face, and furthermore a terminal section 123 for operating the driving circuit sections 121, 122 is also formed on the same face.

In the same manner as in the first embodiment described above, components such as a transparent electrode for display and an orientation film are placed on the display section 102, and furthermore a sealing resin 105 for bonding the one original glass substrate 100 to the other original glass substrate 101 is formed so as to surround the display section 102. Moreover, in the second embodiment, encapsulating means 203 which is made by the same material as used for the sealing resin 105 is formed so as to surround the driving circuit sections 121, 122 and the terminal section 123. In the example of FIGS. 8 and 9, the sealing resin 105 and the encapsulating means 203 are integrated into one piece.

The encapsulating means 203 plays a role in preventing the driving circuit sections 121, 122 and the terminal section 123 from being damaged in the thinning process performed later. Further, the encapsulating means 203 is made by the same material as used for the sealing resin 105, whereby it is not necessary to add a new step of forming the encapsulating means 203. After that, in the state as described above, the other original glass substrate 101 having the same size as the one original glass substrate 100 is bonded to the one original glass substrate 100. As a result, the assembly of devices E as shown in FIG. 8 is completed.

Next, as shown in FIG. 9, both the original glass substrates 100, 101 of the assembly of devices E are divided for each display section 102 at a position indicated by the center line 108, whereby the assembly of devices E is separated into cell members of individual liquid crystal display devices. Then, for the purpose of forming liquid crystal display devices, a liquid crystal material is injected through an injection hole 106 of a cell member of each individual liquid crystal display device by the vacuum injection method into a sealed gap between each pair of glass substrates composing the cell member, and the injection hole 106 is encapsulated by placing an encapsulating material 107 at the injection hole 106.

In the same manner as in the first embodiment described above, also in the second embodiment, as shown in FIG. 3, a liquid crystal display device F produced in the steps as illustrated in FIGS. 8 and 9 is stored in a substrate cassette 201 which is capable of storing a plurality of liquid crystal display devices, and a plurality of (five, in the second embodiment) liquid crystal display devices are immersed at a time in an etching tank 200 which contains an etchant 202 consisting of hydrofluoric acid, whereby a thinning process of the glass substrates 100a, 101a composing the liquid crystal display device F is performed.

After the respective glass substrates 100a, 101a composing a liquid crystal display device are thinned to have a thickness of about 0.3 mm to 0.7 mm in this way, the substrate cassette 201 is pulled out and washed by pure water to thoroughly eliminate the etchant attached thereon.

Figure 10:
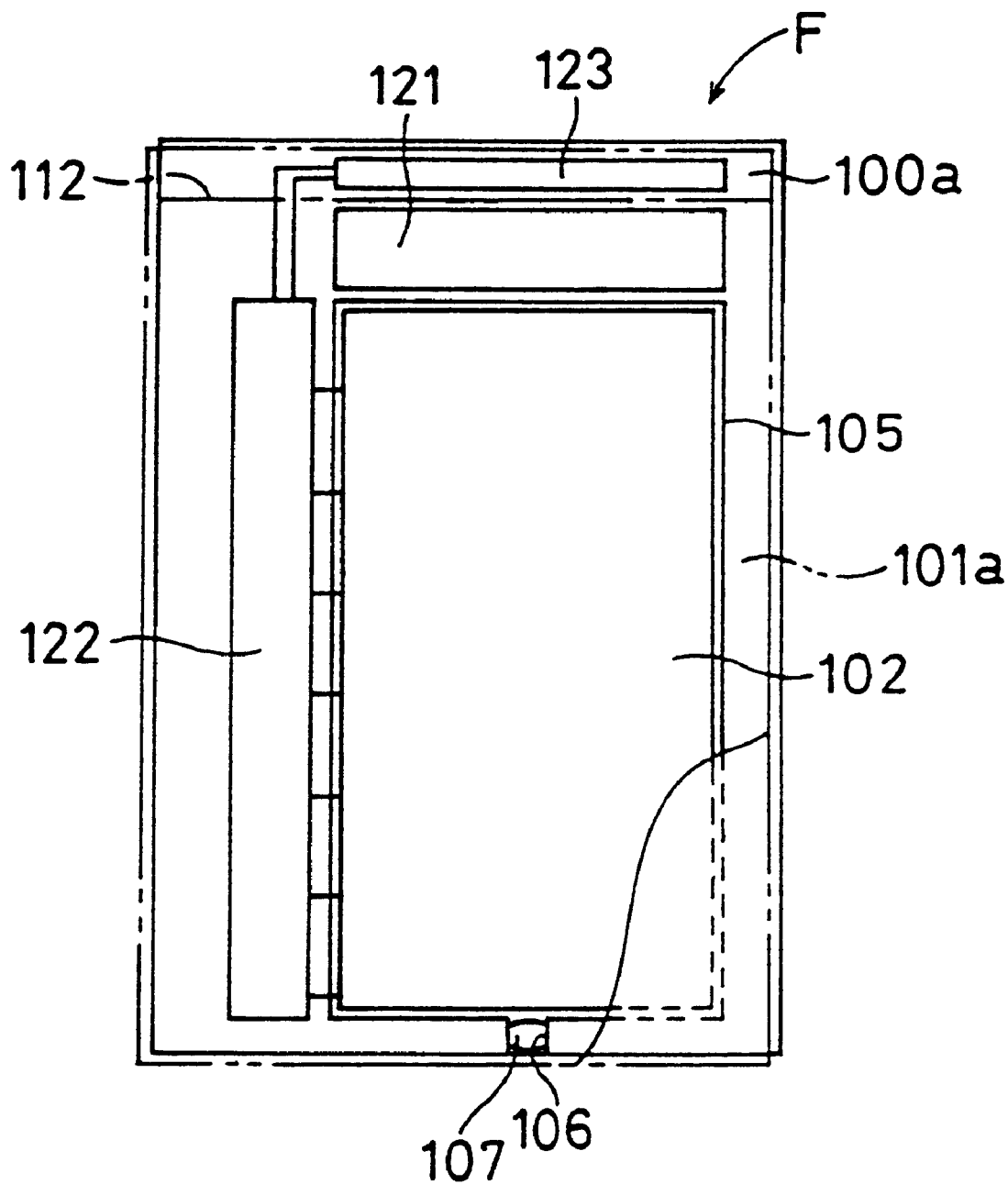
FIG. 10 is a plan view showing a driver integral-type liquid crystal display device in the second embodiment.
Figure 11:
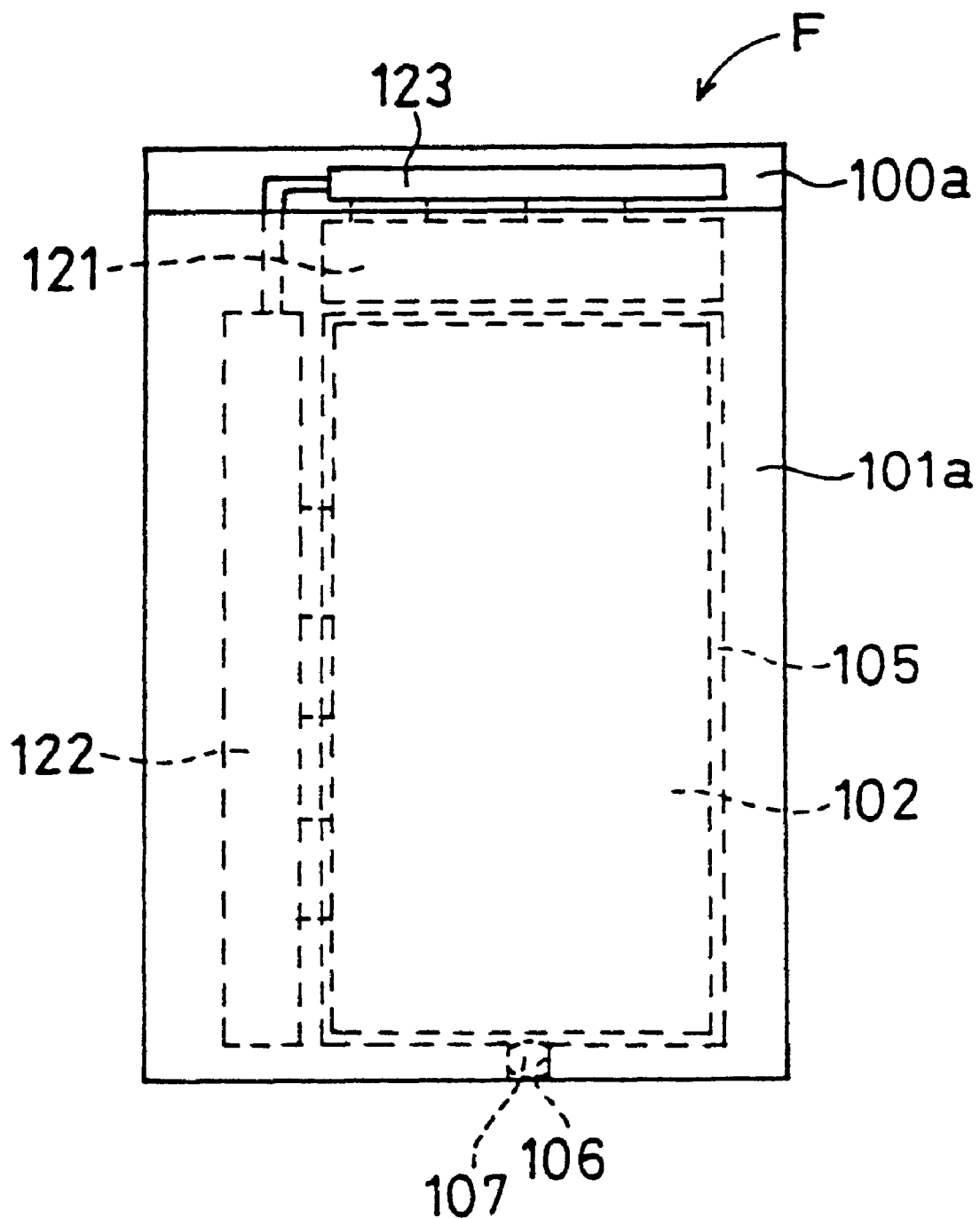
FIG. 11 is a plan view showing the driver integral-type liquid crystal display device in the second embodiment.

After that, as shown in FIG. 10, the encapsulating means 203 is removed from the substrates by dividing the end portions of the pair of glass substrates 100a, 101a which compose the liquid crystal display device F or peeling off the encapsulating means 203 from the substrates, and furthermore only the glass substrate 101a on which the terminal section 123 is not formed is divided at a position indicated by the center line 112 so that the terminal section 123 is exposed. Then, an FPC, or the like, for inputting signals to the terminal section 123 is connected in the end, with the result that the liquid crystal display device F as shown in FIG. 11 is completed.

In the method for producing a liquid crystal display device in the second embodiment, the thinning process is performed by placing the encapsulating means between the two glass substrates 100a, 101a which compose the liquid crystal display device F, and immersing the liquid crystal display device into which liquid crystal was sealed, in the etching tank. However, the invention is not limited to the embodiment of performing the thinning process as described above, and may be implemented by an embodiment of performing the thinning process of the glass substrates 100a, 101a by performing chemical abrasion from one side of the outer faces of the glass substrates 100a, 101a composing the liquid crystal display device F, in which case it is not necessarily required to provide the encapsulating means.

Further, in the method for producing a liquid crystal display device in the second embodiment, the pair of original glass substrates having an area for two liquid crystal display devices are bonded to each other. Otherwise, for example, only the one original glass substrate 100 on which the display sections, the terminal sections and the driving circuit sections are formed may have an area for a plurality of liquid crystal display devices at all times during production of the assembly of devices, while the other original glass substrate 101 bonded to the one glass substrate 100 may be divided into substrates having an area for substantially one liquid crystal display device and thereafter bonded to positions opposed to the respective display sections formed on the one original glass substrate 100. As a result, in a case where one of the terminal sections, the driving circuit sections or the display sections formed on the one original glass substrate 100 has a defect, it is not necessary to bond the other original glass substrate 101 having an area for one liquid crystal display device to a position opposed to the faulty section, so that it is possible to efficiently use the original glass substrates. Also in this case, after division of the assembly of devices into the cell members of the individual liquid crystal display devices, a plurality of liquid crystal display devices may be thinned at a time while being held by the substrate cassette, or the like.

As apparent from the above explanation, in the second embodiment, a display device which comprises a driving circuit section as well as a display section and a terminal section is designated as an object of production. In the case of producing such a display device by the production method as described in the first embodiment, the sealing resin is placed around the display section, and the encapsulating means is placed around the driving circuit section. Therefore, also in the driving circuit integral-type display device, it is possible to implement the substrate thinning process in a simple manner without causing damage to the driving circuit section formed on the substrate.

In a case where the encapsulating means is made by the same material used for the sealing resin in the first and second embodiments as described above, the encapsulating means may be placed at the ventilation hole to prevent increase of the barometrical pressure between the glass substrates 100, 101.

Further, although an assembly of devices from which two liquid crystal display devices are obtainable is illustrated in the first and second embodiments described above, the invention can also be applied to an assembly of devices from which three or more liquid crystal display devices are obtainable. Moreover, the substrate is not limited to a glass substrate and may be made by another material.

Furthermore, although a liquid crystal display device is illustrated in the first and second embodiments described above, the invention can also be applied to another display device such as an EL display device.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for producing a plurality of display devices, the method comprising:

forming a plurality of display sections and a plurality of driving circuit sections for supplying signals to corresponding display sections on a first substrate, and thereafter forming a sealing resin layer on the first substrate in a manner such that the sealing resin layer on the first substrate is formed around each of the display sections;

forming encapsulating means around each of the driving circuit sections;

bonding a second substrate to the first substrate via the sealing resin layer;

dividing the substrates having been bonded to separate the substrates into a plurality of display devices each including an area for an individual one of the display sections; and performing a substrate thinning process of causing substrate holding means to hold the display devices and thinning at least one substrate of each display device as the substrates are held by the substrate holding means.

2. The method for producing a display device of claim 1, wherein the step of performing the substrate thinning process of thinning the at least one substrate is performed by a chemical abrading method.

3. The method for producing a display device of claim 1, wherein the step of performing the substrate thinning process of thinning the at least one substrate is performed in a state where the encapsulating means is formed on an end portion of the substrates after said dividing.

4. The method for producing a display device of claim 3, wherein the encapsulating means is formed in the same step as and of the same material as the sealing resin layer.

5. The method for producing a display device of claim 1, wherein the substrate holding means is a substrate cassette capable of storing a plurality of pairs of substrates having been separated to be of a size of each individual display device.

6. The method for producing a display device of claim 1, wherein the second substrate has an area for multiple display devices.

7. The method for producing a display device of claim 1, wherein before the substrate thinning process, a liquid crystal material is injected into a gap for each display section surrounded by the sealing resin layer between the substrates.

8. A method of making a liquid crystal display, the method comprising:

forming a display section and at least one terminal portion on a first substrate;

depositing a sealing resin layer portion on the first substrate so as to surround the display section, and during the same depositing step depositing an encapsulating layer on the first substrate so as to surround the terminal portion, so that the sealing resin layer portion and the encapsulating layer are of the same material and are deposited during a common deposition step, wherein the encapsulating layer is for protecting the terminal portion during a thinning step;

bonding a second substrate to the first substrate via at least the sealing resin layer portion; and thinning at least one of the first and second substrates while the substrates bonded to one another are located in a thinning tank.

9. The method of claim 8, further comprising a step of, after said thinning, removing the encapsulating layer so as to expose the terminal portion.

* * * * *